US012777511B2

(12) United States Patent
Singh et al.

(10) Patent No.: US 12,777,511 B2
(45) Date of Patent: Oct. 27, 2026

(54) SYSTEM AND METHODS FOR SCHEDULING IN MMWAVE NETWORKS

(71) Applicant: Indian Institute of Technology Bombay, Mumbai (IN)

(72) Inventors: Santosh Kumar Singh, Mumbai (IN); Satyabrata Sahu, Mumbai (IN); Ayushi Thawait, Mumbai (IN); Prasanna S. Chaporkar, Mumbai (IN); Gaurav Sudhir Kasbekar, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 556 days.

(21) Appl. No.: 18/295,199

(22) Filed: Apr. 3, 2023

(65) Prior Publication Data

US 2024/0237049 A1 Jul. 11, 2024

(30) Foreign Application Priority Data

Jan. 7, 2023 (IN) ............................ 202321001432

(51) Int. Cl.

| | |
|---|---|
| ***H04W 72/542*** | (2023.01) |
| ***H04B 7/0456*** | (2017.01) |
| ***H04W 72/121*** | (2023.01) |
| ***H04W 72/1263*** | (2023.01) |
| ***H04W 72/50*** | (2023.01) |

(52) U.S. Cl.

CPC ........ *H04W 72/542* (2023.01); *H04B 7/0456* (2013.01); *H04W 72/121* (2013.01); *H04W 72/1263* (2013.01); *H04W 72/535* (2023.01)

(58) Field of Classification Search

CPC .............. H04B 7/0456; H04W 72/121; H04W 72/1263; H04W 72/535; H04W 72/542

See application file for complete search history.

(56) References Cited

U.S. PATENT DOCUMENTS

| | | | | |
|---|---|---|---|---|
| 10,637,544 B1 * | 4/2020 | Shattil | .................. | H04B 7/0691 |
| 11,509,361 B1 * | 11/2022 | Sahin | ................... | H04B 7/0452 |
| 2023/0098863 A1 * | 3/2023 | Jalloul | .................. | H04L 5/0051<br>370/329 |
| 2024/0292248 A1 * | 8/2024 | Kleinbeck | ............. | H04W 24/08 |

OTHER PUBLICATIONS

Dampahalage et al. , Weighted-Sum-Rate Maximization for an Reconfigurable Intelligent Surface Aided Vehicular Network, Feb. 5, 2021, https://ieeexplore.ieee.org. pp. 1-17 (Year: 2021).*

* cited by examiner

*Primary Examiner* — Romani Ohri

(74) *Attorney, Agent, or Firm* — Hauptman Ham, LLP

(57) ABSTRACT

Embodiments herein disclose a system and methods for scheduling in mmWave networks. Embodiments herein disclose a system and methods for scheduling in mmWave networks, wherein the router is provided with instructions on how to route packets requested by User Equipments (UEs) to the respective Access Points (APs). Embodiments herein disclose a system and methods for scheduling in mmWave networks, wherein each AP is provided with instructions on which UE the AP has to transmit data to and using which beam.

14 Claims, 5 Drawing Sheets

SYSTEM AND METHODS FOR SCHEDULING IN MMWAVE NETWORKS

PRIORITY

The present application claims the priority of India application No. 202321001432, filed Jan. 7, 2023, which is incorporated herein by reference in its entirety.

TECHNICAL FIELD

Embodiments disclosed herein relate to wireless communication networks, and more particularly to managing scheduling in Millimeter-Wave (mmWave) networks.

BACKGROUND

Millimeter-Wave (mmWave) radios use a multi-antenna phased array to concentrate signal energy into narrow beams (which can be parallel to each other), to enable directional multi-Gbps wireless connections. The parallel nature of the beams can enable high throughputs.

However, the beams may have irregular beam patterns, which can result in interference between the various beams.

OBJECTS

The principal object of embodiments herein is to disclose a system and methods for scheduling in mmWave networks.

Another object of embodiments herein is to disclose a system and methods for scheduling in mmWave networks, wherein the router is provided with instructions on how to route packets requested by User Equipments (UEs) to the respective Access Points (APs).

Another object of embodiments herein is to disclose a system and methods for scheduling in mmWave networks, wherein each AP is provided with instructions on which UE the AP has to transmit data to and using which beam.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
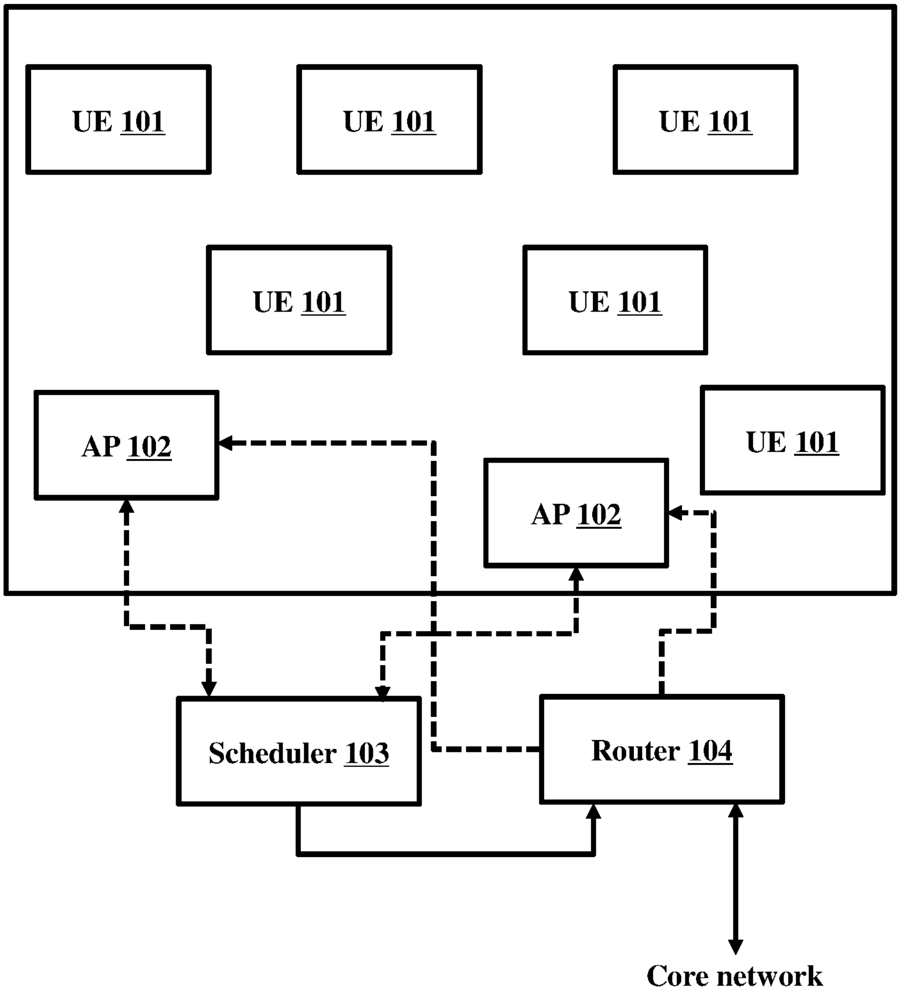
FIG. 1 illustrates an example mmWave network, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a system and methods for scheduling in mmWave networks. Referring now to the drawings, and more particularly to FIGS. 1 through 3B, where similar reference characters denote corresponding features consistently throughout the figures, there are shown embodiments.

Embodiments herein disclose a system and methods for scheduling in mmWave networks. Embodiments herein disclose a system and methods for scheduling in mmWave networks, wherein the router is provided with instructions on how to route packets requested by User Equipments (UEs) to the respective Access Points (APs). Embodiments herein disclose a system and methods for scheduling in mmWave networks, wherein each AP is provided with instructions on which UE the AP has to transmit data to and using which beam.

FIG. 1 illustrates an example mmWave network. In the depicted example mmWave network, there are a plurality of APs 102 and UEs 101. Each AP in the system is connected to a scheduler 103 through a high-speed link. Each AP 102 has multiple beams. Time is divided into slots of equal duration. Each slot is further divided into two parts; a Slot Header Interval (SHI) and a Data Transmission Interval (DTI). The AP 102 remains static; however, each UE 101 can move independently of other UEs 101 at the beginning of each slot and remains static within a slot. The DTI can be further divided into intervals of equal duration (hereinafter referred to as schedules). In any schedule, an AP 102 can transmit data to only one UE 101 using one of its beams. Further, a UE 101 can receive data from only one AP 102. The scheduler can obtain Received Signal Strength (RSS) information at each UE 101 from each AP 102 and for all beams during the SHI of a slot. In each schedule, the scheduler 103 can instruct the routers 104 on how they should route packets requested by the UEs 101 to the APs 102. In each schedule, the scheduler 103 can instruct each AP 102 on which UE 101 it should transmit data to and using which beam.

In an embodiment herein, the scheduler 103 obtains RSS information at each UE 101 from each AP 102 and for all beams in the SHI of a slot. The scheduler 103 uses this RSS information to select at most one UE 101 and beam for each AP 102 and for all schedules of a slot. For a given schedule, the scheduler 103 can select the UE 101 and beam for each AP 102 in two steps:

- An initial selection of at most one UE and beam for each AP is performed; and
- An iterative improvement over the initial selection of UE and beam for each AP is performed.

The scheduler 103 can perform the initial selection of the UE 101 and beam for each AP 102 in an iterative manner. In each iteration, a UE 101 and a beam can be selected for an AP 102, which has not been assigned a UE 101 and beam till the previous iteration. In any iteration of the initial selection, the UE 101 for an AP 102 is selected from the set of UEs 101 which have not been selected for any AP 102 till the previous iteration.

In a given iteration of the initial selection, the scheduler 103 computes a first matrix M. Each row of the matrix M corresponds to a UE 101 that is not selected for any AP 102 till the previous iteration. Each column of the matrix M corresponds to an AP 102 for which no UE 101 and beam selection has been done till the previous iteration. Then, the scheduler 103 selects that UE 101 and AP 102 which corresponds to the highest element of the matrix M. The scheduler 103 reduces the number of rows and the number of columns of the matrix M by one after each iteration of the initial selection. Also, the initial selection process is complete after a number of iterations equal to a minimum of:

the number of APs, and the number of UEs in the system.

The value of an element of M corresponding to a UE and an AP in a given iteration is a product of two quantities:

the rate at the UE from the AP considering interference from the APs for which UE and beam have been selected till the previous iteration, and the weight of the UE.

In an embodiment herein, the rate at the UE from the AP considering interference from the APs for which UE and beam have been selected till the previous iteration can be computed using the Shannon capacity formula so as to ensure fairness for the UEs (101).

The weight of the UE can be assigned in various ways. In an embodiment herein, the weight of the UE can be based on how urgently data needs to be transmitted to or from the UE. In an embodiment herein, the weight of the UE can be the quantity of data that is waiting in a queue for transmission to or from the UE. In an embodiment herein, the weight of the UE can be selected so as to ensure fairness for different UEs. Note that the weight of a UE can be changed in each schedule of a slot to ensure fairness for UEs. In all computations, the beam at an AP for a UE is the beam at the AP which provides the highest RSS at the UE.

Once the process of initial UE and beam selection for each AP in a given schedule is completed, the scheduler 103 moves to the iterative improvement step. Note that each iteration of the iterative improvement step takes the current selection of UE 101 and beam for each AP 102 as input and provides a new selection of UE 101 and beam for each AP 102 as the output such that a weighted sum rate corresponding to the new selection either improves or remains the same compared with the old selection.

The weighted sum rate (given a selection of UE 101 and beam for each AP 102) is a sum of weighted rate of each UE 101. The weighted rate for a UE 101 (given the selection of UE 101 and beam for each AP 102) is a product of the rate at the UE from the AP to which it is assigned (considering interference from the other APs in the given selection) and the weight of the UE.

Also note that in any iteration of the iterative improvement step, the UE 101 and beam for at most one AP 102 change, and UE 101 and beam at the other APs 102 remain the same. In an embodiment herein, the scheduler 103 can select the AP 102, for the UE 101 and beam change in a round-robin fashion. The scheduler 103 can keep the selected AP 102 (for UE 101 and beam change) same for a number of iterations of iterative improvement steps equal to the cardinality of the set of UEs which have not been selected for any AP in the selection (UE 101 and beam for each APs) before selecting the AP 102 (for UE and beam change). Also, the scheduler 103 can select a new UE (from the set of UEs which have not been selected for any AP in the selection obtained before selecting the AP 102 (for UE and beam change)) in a round-robin fashion keeping the selected AP 102 (for UE and beam change) same. For the selected AP 102 in a given iteration of the iterative improvement step, the scheduler 103 may not obtain a new UE 101. If no new UE 101 is obtained, then the selection of the UE 101 and the beam for each AP 102 in the next iteration of the iterative improvement step remains the same as the current selection, otherwise, it gets changed. The scheduler 103 can obtain a new UE 101 (from the set of UEs 101 which are not selected for any AP 102 in the current selection) in an iteration of iterative improvement steps for the AP 102, only if the selection of the new UE 101 for the AP 102 provides larger weighted sum rate than the weighted sum rate corresponding to the current selection. The process of the iterative improvement step is terminated after some fixed number of iterations over the APs 102.

Figure 2A:
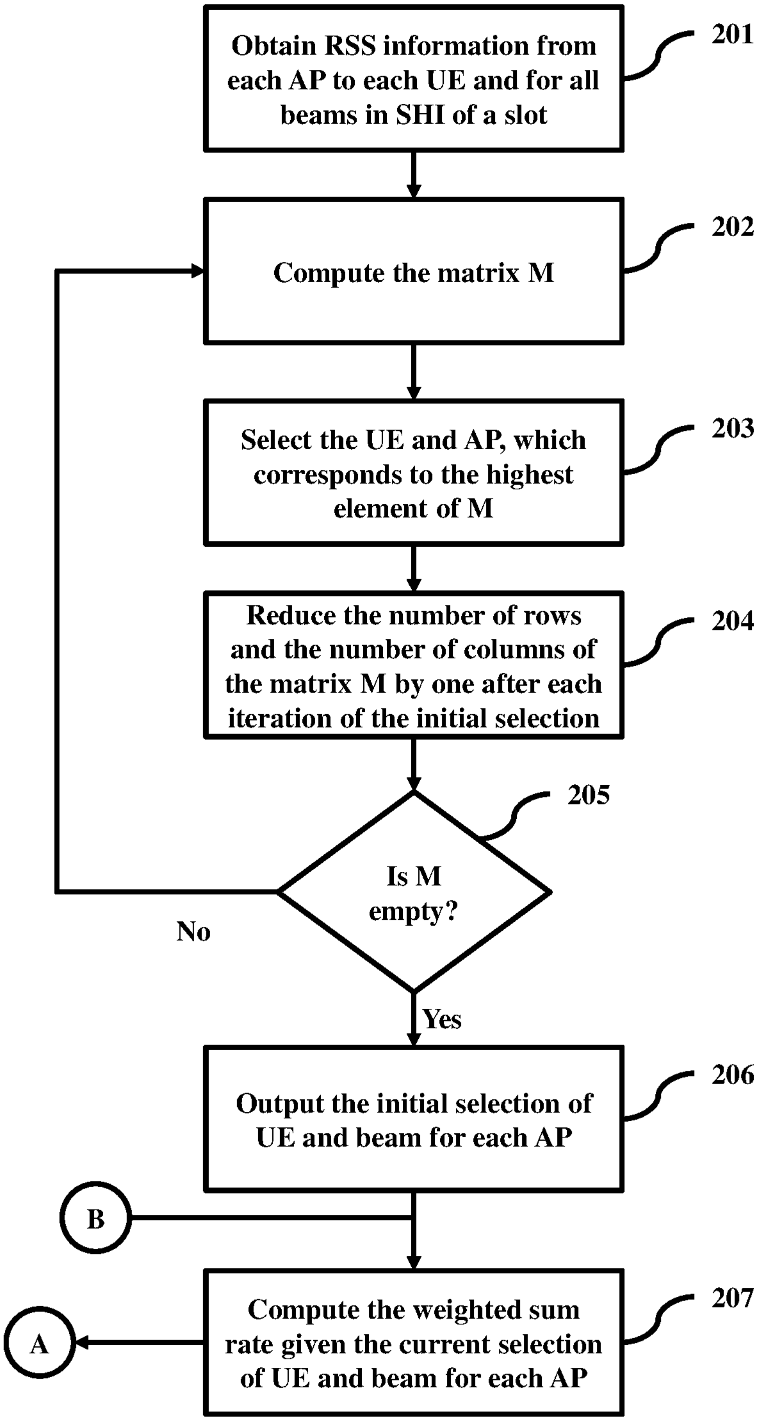
FIGS. 2A and 2B are flowcharts depicting the process involved in the selection of UE and beam for each AP for a schedule of a slot, according to embodiments as disclosed herein.
Figure 2B:
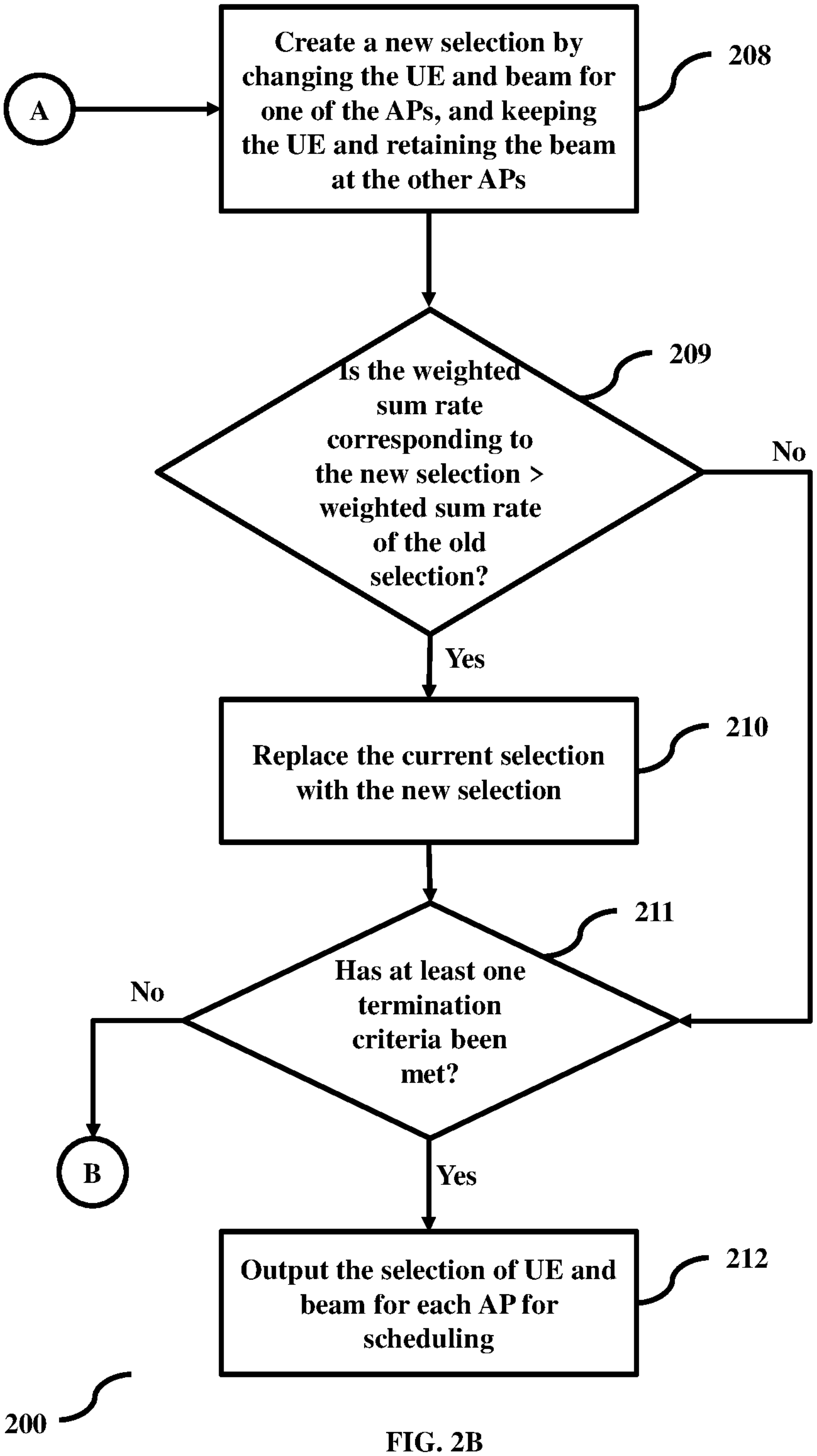

FIGS. 2A and 2B are flowcharts depicting the process involved in the selection of UE and beam for each AP for a schedule of a slot. In step 201, the scheduler 103 obtains RSS information from each AP 102 to each UE 101 and for all beams in SHI of a slot.

In step 202, the scheduler 103 computes the matrix M. Each row of the matrix M corresponds to a UE 101 that is not selected for any AP 102, till the previous iteration. Each column of the matrix M corresponds to an AP 102 for which no UE 101 and beam selection has been done till the previous iteration. The value of an element of the matrix M corresponding to a UE 101 and an AP 102 in a given iteration is a product of the rate at the UE 101 from the AP 102 considering interference from the APs 102 for which UE 101 and beam have been selected till the previous iteration and the weight of the UE 101.

In step 203, the scheduler 103 can perform an initial selection by selecting the UE 101 and AP 102, which corresponds to the highest element of M. In all computations, the beam at an AP 102 for a UE 101 is that beam at the AP 102 which provides the highest RSS at the UE 101.

In step 204, the scheduler 103 reduces the number of rows and the number of columns of the matrix M by one after each iteration of the initial selection (step 203).

In step 205, the scheduler 103 checks whether the matrix M is empty; i.e., the matrix M is empty if all the APs 102 or the UEs 101 have been already assigned and the matrix M is not empty if all the APs 102 or the UEs 101 have not been assigned. If the matrix M is not empty, the scheduler 103 continues repeating the steps from step 202 till the matrix M is empty.

In step 206, if all the APs 102 or UEs 101 have been assigned, then the scheduler 103 outputs the initial selection of UE 101 and beam for each AP 102 (which is referred to herein as a current selection).

In step 207, the scheduler 103 computes the weighted sum rate given the current selection of UE 101 and beam for each AP 102. The weighted sum rate given a selection of UE 101 and beam for each AP 102 is the sum of the weighted rate of each UE 101. The weighted rate for a UE 101 given the selection of UE 101 and beam for each AP 102 is a product of the rate at the UE 101 from the AP 102 to which it is assigned (considering interference from the other APs 102 in the given selection) and the weight of the UE 101.

Given the current selection of UE and beam for each AP, in step 208, the scheduler 103 creates a new selection by changing the UE 101 and beam for one of the APs 102, and retaining the UE 101 and the beam at the other APs. In an embodiment herein, the scheduler 103 can select the AP 102 (for UE and beam change) in a round-robin fashion. For the selected AP 102 (for UE and beam change) in a given iteration of the iterative improvement step, the scheduler 103 selects a new UE (from the set of UEs which have not been selected for any AP in the selection (UE and beam for each AP) obtained before selection of the AP 102). The scheduler 103 can keep the same selected AP 102 (for UE and beam change) for a number of iterations of iterative improvement steps 207-211 equal to the cardinality of the set of UEs which are not selected for any AP in the selection (UEs and beam for each AP) obtained before selecting the AP 102 (for UE and beam change). The scheduler 103 can select a new UE (from the set of UEs which have not been selected for any AP in the selection obtained before selecting the AP 102 (for UE and beam change)) in a round-robin fashion keeping the selected AP 102 (for UE and beam change) same.

In step 209, scheduler 103 checks if the weighted sum rate corresponding to the new selection is more than the weighted sum rate of the old selection. In step 210, if the weighted sum rate corresponding to the new selection is more than the weighted sum rate corresponding to the old selection, then the scheduler 103 replaces the current selection with the new selection as the current selection. In step 211, the scheduler 103 checks whether at least one termination criterion has been met. In an embodiment herein, the termination criterion can be met by completing a pre-defined number of iterations over APs 102. In step 212, the scheduler 103 outputs the current selection of the UE and beam for each AP for scheduling. Steps 207-211 are the improvement steps. Each iteration over APs improves the weighted sum rate. Note that the number of iterations of iterative improvement steps in one iteration over APs can be greater than the cardinality of a set of APs. The various actions in method 200 may be performed in the order presented or in a different order or simultaneously. Further, in some embodiments, some actions listed in FIGS. 2A and 2B may be omitted.

In an embodiment herein, the scheduler 103 obtains RSS information at each UE 101 from each AP 102 and for all beams in the SHI of a slot. The scheduler 103 uses this RSS information to select the UE 101 and beam for each AP 102 and for all schedules of a slot. The scheduler 103 can perform the task of the selection of UE and beam for each AP in two steps:

- storing of selection of UE 101 and beam for each AP 102 and corresponding weighted sum rate obtained by following a fixed selection process for some fixed number of times; and
- choosing a selection from the stored selection which provides the highest weighted sum rate.

Note that each time the fixed selection process is run, the scheduler 103 can provide a selection of UE 101 and beam for each AP 102. Also, the scheduler 103 can perform the fixed selection process in such a way that each run of the process, can provide a different selection of the UE 101 and beam for each AP 102. Given a schedule, the scheduler 103 can use the fixed selection process to select the UE 101 and beam for each AP 102 in an iterative manner; where in each iteration, a UE 101 and a beam is selected for an AP 102 which was not assigned a UE 101 and beam till the previous iteration. Note that in any iteration of the fixed selection process, the UE 101 for an AP 102 is selected from the set of UEs 101, which have not been assigned to any AP 102 till the previous iteration. In a given iteration of the fixed selection process, the scheduler 103 can compute a second matrix N. Each row of the matrix N corresponds to a UE 101 that was not selected for any AP 102 till the previous iteration. Each column of the matrix N corresponds to an AP 102 for which no UE 101 and beam selection had been done till the previous iteration. In a given iteration of the fixed selection process, the scheduler 103 can select an AP 102, which corresponds to a column of the matrix N, randomly and then selects a UE 101 that corresponds to the maximum element of the selected column of the matrix N. The scheduler 103 can reduce the number of rows and number of columns of the matrix N by one each after each iteration of the fixed selection process. Also, the fixed selection process is complete after a number of iterations equal to a minimum of the number of APs 102; and the number of UEs 101 in the network. The value of an element of the matrix N corresponding to a UE 101 and an AP 102 in a given iteration is a product of two quantities:

- the rate at the UE 101 from the AP 102 considering interference from the beams used at the APs 102 for which UE 101 and AP 102 had been selected till the previous iteration; and
- the weight of the UE 101.

In an embodiment herein, the rate at the UE from the AP considering interference from the APs for which UE and beam have been selected till the previous iteration can be computed using the Shannon capacity formula.

The weight of the UE can be assigned in various ways. In an embodiment herein, the weight of the UE can be based on how urgently data needs to be transmitted to or from the UE. In an embodiment herein, the weight of the UE can be the quantity of data that is waiting in a queue for transmission to or from the UE. In an embodiment herein, the weight of the UE can be selected so as to ensure fairness for different UEs.

The weight of the UE 101 can be changed in each schedule of a slot to ensure fairness for UEs 101. In all computations, the beam at an AP 102 for a UE 101 is the beam that provides the highest RSS at the UE 101.

Figure 3A:
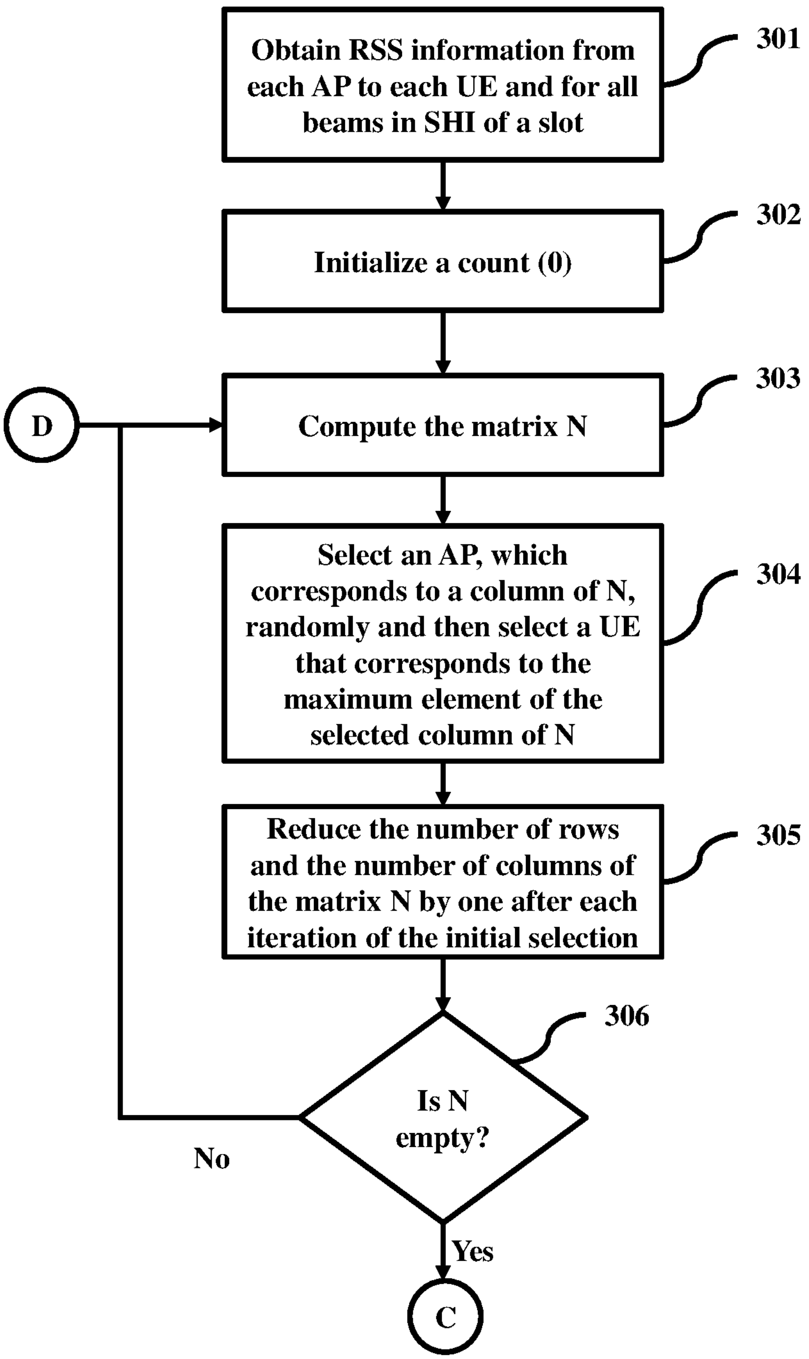
FIGS. 3A and 3B are flowcharts depicting the process involved in the selection of UE and beam for each AP for a schedule of a slot, according to embodiments as disclosed herein.
Figure 3B:
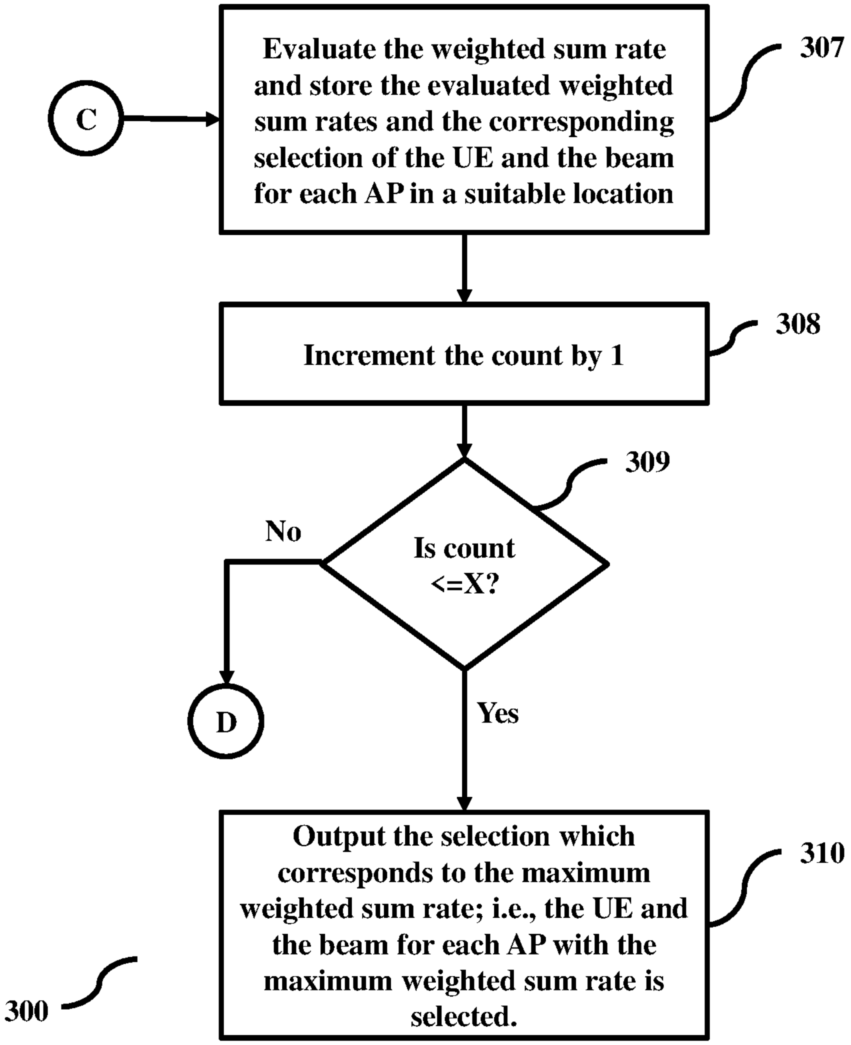

FIGS. 3A and 3B are flowcharts depicting the process involved in the selection of UE and beam for each AP for a schedule of a slot. In step 301, the scheduler 103 obtains RSS information at each UE from each AP and for all beams in the SHI of a slot. In step 302, a count is initialized as zero (0).

In step 303, the scheduler 103 computes the second matrix N. Each row of the matrix N corresponds to a UE 101 that is not selected for any AP 102, till the previous iteration. Each column of the matrix N corresponds to an AP 102 for which no UE 101 and beam selection has been done till the previous iteration. The value of an element of the matrix N corresponding to a UE 101 and an AP 102 in a given iteration is a product of the rate at the UE 101 from the AP 102 considering interference from the APs 102 for which UE 101 and beam been selected till the previous iteration and the weight of the UE 101.

In step 304, the scheduler 103 selects an AP 102, which corresponds to a column of N, randomly and then selects a UE that corresponds to the maximum element of the selected column of N.

In step 305, the scheduler 103 reduces the number of rows and the number of columns of the matrix N by one after each iteration of the initial selection (step 304).

In step 306, the scheduler 103 checks whether the matrix N is empty; i.e., the matrix N is empty if all the APs 102 or the UEs 101 have been already assigned and the matrix N is not empty if all the APs 102 or the UEs 101 have not been assigned. If the matrix N is not empty, the scheduler 103 continues repeating step 303 till the matrix N is empty.

If the matrix N is empty, in step 307, the scheduler 103 evaluates the weighted sum rate and stores the evaluated weighted sum rates and the corresponding selection of the UE 101 and the beam for each AP 102 as a current selection in a suitable location (not shown). The weighted sum rate given a selection of UE 101 and beam for each AP 102 is the sum of the weighted rate of each UE 101. The weighted rate for a UE 101 given the selection of UE 101 and beam for each AP 102 is a product of the rate at the UE 101 from the AP 102 to which it is assigned (considering interference from the other APs 102 in the given selection) and the weight of the UE 101.

In step 308, the count is incremented by 1 and in step 309, a check is made if the count is less than or equal to X, wherein X is a pre-defined number, for which the steps 303-308 should be iterated (i.e., number of iterations to be performed) and each iteration provides a selection of UE 101 and beam for each AP 102. In step 310, the scheduler 103 outputs the selection which corresponds to the maximum weighted sum rate; i.e., the UE 101 and the beam for each AP 102 with the maximum weighted sum rate is selected. The various actions in method 300 may be performed in the order presented, or in a different order. Further, in some embodiments, some actions listed in FIGS. 3A and 3B may be omitted.

The embodiments disclosed herein can be implemented through at least one software program running on at least one hardware device and performing network management functions to control the network elements. The network elements include blocks which can be at least one of a hardware device, or a combination of hardware device and software module.

The embodiment disclosed herein describes a system and methods for scheduling in mmWave networks. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the scope of the embodiments as described herein.

We claim:

1. A method for managing scheduling in Millimeter-Wave networks, the method comprising:

obtaining, by a scheduler in the mmWave network, Received Signal Strength (RSS) information from each Access Point (AP) to each User Equipment (UE) and for all beams in Slot Header Interval (SHI) of a slot;

computing, by the scheduler, a first matrix, wherein each row of the first matrix corresponds to a UE that has not been selected for any AP, till a previous iteration and each column of the first matrix corresponds to an AP for which no UE and beam selection has been done till the previous iteration, and wherein a value of an element of the first matrix corresponding to a UE and an AP in a given iteration is a product of: a rate at the UE from the AP considering interference from the APs for which UE and beam have been selected till the previous iteration; and a weight of the UE;

performing, by the scheduler, a selection of the UE and the AP, which corresponds to a highest element of the first matrix as part of an iterative initial selection process;

reducing, by the scheduler, rows and columns of the first matrix by one after performing the selection of the UE for the AP as part of the iterative initial selection process;

outputting, by the scheduler, the UE and beam for each AP as selected in the iterative initial selection process, if at least one of all the APs, and all the UEs have been assigned as a current selection;

computing, by the scheduler, a weighted sum rate based on the selection obtained from one of the iterative initial selection process or an iteration of the iterative improvement process;

creating, by the scheduler, a new selection, wherein the new selection comprises changing the UE and beam for one of the APs, and keeping the UE and retaining the beam at the other APs;

replacing, by the scheduler, the current selection obtained from one of the iterative initial selection process or the iteration of the iterative improvement process with the new selection as the current selection, if a weighted sum rate corresponding to the new selection is more than the weighted sum rate of the current selection obtained from one of the iterative initial selection process or the iteration of the iterative improvement process;

retaining, by the scheduler, the current selection when the weighted sum rate corresponding to the new selection is not greater than the weighted sum rate of the current selection;

checking, by the scheduler, whether at least one termination criterion has been met, wherein the at least one termination criterion is considered met by completing a pre-defined number of iterations over the APs; and outputting, by the scheduler, the current selection resulting from performing the replacing and retaining steps, for scheduling, on at least one termination criterion being met.

2. The method, as claimed in claim 1, wherein the scheduler is configured to compute the rate at the UE from the AP considering interference from the APs for which the UE and beam have been selected till the previous iteration using a Shannon capacity formula so as to ensure fairness for different UEs.

3. The method, as claimed in claim 1, wherein the scheduler is configured to assign the weight of the UE based on: at least one of how urgently data needs to be transmitted to or from the UE; and quantity of data that is waiting in a queue for transmission to or from the UE.

4. The method, as claimed in claim 1, wherein performing the iterative initial selection process by the scheduler comprises selecting a beam at an AP for a UE is that beam at the AP which provides the highest RSS at the UE.

5. The method, as claimed in claim 1, wherein if at least one of all the APs, and all the UEs have been assigned as the current selection, the first matrix is empty.

6. The method, as claimed in claim 1, wherein the weighted sum rate given a selection of the UE and beam for each AP is a sum of a weighted rate of each UE, wherein the weighted rate for a UE is a product of the rate at the UE from the AP to which it is assigned, considering interference from other APs in the given selection, and a weight of the UE.

7. The method, as claimed in claim 1, wherein the scheduler selects the AP in a round-robin fashion.

8. A scheduler in a Millimeter-Wave (mmWave) network, the scheduler configured for:

obtaining Received Signal Strength (RSS) information from each Access Point (AP) to each User Equipment (UE) and for all beams in Slot Header Interval (SHI) of a slot;

computing a first matrix, wherein each row of the first matrix corresponds to a UE that has not been selected for any AP, till a previous iteration and each column of the first matrix corresponds to an AP for which no UE and beam selection has been done till the previous iteration, and wherein a value of an element of the first matrix corresponding to a UE and an AP in a given iteration is a product of: a rate at the UE from the AP considering interference from the APs for which UE and beam have been selected till the previous iteration; and a weight of the UE;

performing a selection of a UE and an AP, which corresponds to the highest element of the first matrix as part of an iterative initial selection process;

reducing rows and columns of the first matrix by one after performing the selection of a UE for an AP as part of the iterative initial selection process;

outputting the UE and beam for each AP as selected in the iterative initial selection process, if at least one of all the APs, and all the UEs have been assigned as a current selection;

computing a weighted sum rate based on the selection obtained from one of the iterative initial selection process or an iteration of the iterative improvement process;

creating a new selection, wherein the new selection comprises changing the UE and beam for one of the APs, and keeping the UE and retaining the beam at the other APs;

replacing the current selection obtained from one of the iterative initial selection process or the iteration of the iterative improvement process with the new selection as the current selection, if a weighted sum rate corresponding to the new selection is more than the weighted sum rate of the current selection obtained from one of the iterative initial selection process or the iteration of the iterative improvement process;

retain the current selection when the weighted sum rate corresponding to the new selection is not greater than the weighted sum rate of the current selection;

check whether at least one termination criterion has been met, wherein the at least one termination criterion is considered met by completing a pre-defined number of iterations over the APs; and output the current selection resulting after performing the replacing and retaining steps, for scheduling, on at least one termination criterion being met.

9. The scheduler, as claimed in claim 8, wherein the scheduler is configured to compute the rate at the UE from the AP considering interference from the APs for which the UE and beam have been selected till the previous iteration using a Shannon capacity formula so as to ensure fairness for different UEs.

10. The scheduler, as claimed in claim 8, wherein the scheduler is configured to assign the weight of the UE based on: at least one of how urgently data needs to be transmitted to or from the UE; and quantity of data that is waiting in a queue for transmission to or from the UE.

11. The scheduler, as claimed in claim 8, wherein performing the iterative initial selection process by the scheduler comprises selecting a beam at an AP for a UE is that beam at the AP which provides the highest RSS at the UE.

12. The scheduler, as claimed in claim 8, wherein if at least one of all the APs, and all the UEs have been assigned as the current selection, the first matrix is empty.

13. The scheduler, as claimed in claim 8, wherein the weighted sum rate given a selection of the UE and beam for each AP is a sum of a weighted rate of each UE, wherein the weighted rate for a UE is a product of the rate at the UE from the AP to which it is assigned, considering interference from other APs in the given selection, and a weight of the UE.

14. The scheduler, as claimed in claim 8, wherein the scheduler is configured to select the AP in a round-robin fashion.

* * * * *